(12) United States Patent
Sung et al.

(10) Patent No.: US 10,760,672 B2
(45) Date of Patent: Sep. 1, 2020

(54) COOLANT SYSTEM PRESSURE DROP REDUCTION

(71) Applicant: FORD GLOBAL TECHNOLOGIES, LLC, Dearborn, MI (US)

(72) Inventors: Myung Ki Sung, Ypsilanti, MI (US); Edward Chan-Jiun Jih, Troy, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 336 days.

(21) Appl. No.: 15/473,105

(22) Filed: Mar. 29, 2017

(65) Prior Publication Data
US 2018/0283526 A1    Oct. 4, 2018

(51) Int. Cl.
| | |
|---|---|
| *F16H 57/04* | (2010.01) |
| *F28F 13/18* | (2006.01) |
| *F28D 21/00* | (2006.01) |

(52) U.S. Cl.
CPC ....... *F16H 57/042* (2013.01); *F16H 57/0417* (2013.01); *F16H 57/0441* (2013.01); *F28F 13/18* (2013.01); *F28D 2021/0089* (2013.01); *F28F 2245/00* (2013.01); *F28F 2245/02* (2013.01); *F28F 2245/04* (2013.01)

(58) Field of Classification Search
CPC ............... F16H 57/042; F16H 57/0417; F16H 57/0441; F28F 13/18; F28F 2245/00; F28F 2245/02; F28F 2245/04; F28D 1/0341; F28D 1/035; F28D 1/0358

USPC .......................................................... 165/133
See application file for complete search history.

(56) References Cited

U.S. PATENT DOCUMENTS

| | | | | |
|---|---|---|---|---|
| 3,613,779 | A * | 10/1971 | Brown | F28D 5/00 159/13.1 |
| 5,042,991 | A | 8/1991 | Kunz et al. | |
| 5,184,478 | A * | 2/1993 | Kutsuna | F25B 39/02 165/133 |
| 5,203,402 | A * | 4/1993 | Nishishita | B05D 5/04 165/133 |
| 5,470,431 | A * | 11/1995 | Okuda | F25B 39/022 159/27.1 |
| 5,724,479 | A * | 3/1998 | Takahashi | E04D 13/103 392/496 |
| 6,103,379 | A | 8/2000 | Margel et al. | |
| 6,458,867 | B1 | 10/2002 | Wang et al. | |

(Continued)

FOREIGN PATENT DOCUMENTS

| | | |
|---|---|---|
| DE | 10 2012 208941 A1 | 12/2013 |
| WO | 2013/058843 A2 | 4/2013 |

*Primary Examiner* — Tho V Duong
*Assistant Examiner* — Raheena R Malik
(74) *Attorney, Agent, or Firm* — David Kelley; Brooks Kushman P.C.

(57) ABSTRACT

A vehicle system is disclosed. The vehicle system includes an automatic transmission fluid cooling conduit. The automatic transmission fluid cooling conduit includes an inlet portion, an outlet portion, and an elbow portion connecting the inlet and outlet portions and having an inner surface defining a cavity in fluid communication with the inlet and outlet portions. The automatic transmission fluid cooling conduit also includes an oleophobic or hydrophobic coating on the inner surface. The oleophobic or hydrophobic coating is configured to reduce eddy currents in the cavity.

9 Claims, 2 Drawing Sheets

(56) References Cited

U.S. PATENT DOCUMENTS

| | | | |
|---|---|---|---|
| 6,503,958 B2 | 1/2003 | Hughes et al. | |
| 6,645,569 B2 | 11/2003 | Cramer et al. | |
| 6,723,378 B2 | 4/2004 | Hrubesh et al. | |
| 6,743,467 B1 | 6/2004 | Jones et al. | |
| 7,204,298 B2 * | 4/2007 | Hodes | F28F 3/048 |
| | | | 165/80.4 |
| 7,985,451 B2 | 7/2011 | Luzinov et al. | |
| 7,989,619 B2 | 8/2011 | Guire et al. | |
| 7,998,554 B2 | 8/2011 | Wang et al. | |
| 8,007,638 B2 | 8/2011 | Baker et al. | |
| 8,187,707 B2 | 5/2012 | Van Benthem et al. | |
| 8,202,614 B2 | 6/2012 | Koene et al. | |
| 8,258,206 B2 | 9/2012 | Kanagasabapathy et al. | |
| 8,361,176 B2 | 1/2013 | Seth et al. | |
| 8,449,993 B2 * | 5/2013 | Gentleman | C23C 30/00 |
| | | | 428/701 |
| 8,801,850 B2 | 8/2014 | Yoshida et al. | |
| 2006/0029808 A1 | 2/2006 | Zhai et al. | |
| 2006/0157227 A1 * | 7/2006 | Choi | B82Y 30/00 |
| | | | 165/104.21 |
| 2010/0314575 A1 | 12/2010 | Gao et al. | |
| 2011/0303541 A1 * | 12/2011 | Garimella | B01D 57/02 |
| | | | 204/450 |
| 2012/0009396 A1 | 1/2012 | Sikka et al. | |
| 2012/0045954 A1 | 2/2012 | Bleecher et al. | |
| 2013/0109261 A1 | 5/2013 | Koene | |
| 2014/0020783 A1 * | 1/2014 | Zazovsky | F16L 9/00 |
| | | | 138/141 |
| 2014/0069620 A1 | 3/2014 | Takaswa et al. | |

\* cited by examiner

COOLANT SYSTEM PRESSURE DROP REDUCTION

TECHNICAL FIELD

The present disclosure relates to the use of coating materials in automatic transmission and/or inverter fluid systems.

BACKGROUND

Automatic transmissions include meshing gearing elements which can be lubricated and cooled by a coolant (e.g., water/glycol, oil, or automatic transmission fluid). Coolant flows through systems such as automatic transmission fluid (ATF) flow systems before entering a transmission housing. An ATF flow system typically includes conduit flow lines, a heat exchanger, and a pump. The ATF flow system heat exchanger is typically referred to as an ATF cooler. Coolant is circulated through the lines and cooler by the coolant pump. Parasitic pressure drops within the lines and ATF cooler cause power losses and require a large coolant pump capacity. By minimizing parasitic pressure drops in the ATF flow system, vehicle fuel economy may be improved and coolant pump size may be reduced.

SUMMARY

According to an embodiment, a vehicle system is disclosed. The vehicle system includes an automatic transmission fluid cooling conduit. The automatic transmission fluid cooling conduit includes an inlet portion, an outlet portion, and an elbow portion connecting the inlet and outlet portions and having an inner surface defining a cavity in fluid communication with the inlet and outlet portions. The automatic transmission fluid cooling conduit also includes an oleophobic or hydrophobic coating on the inner surface. The oleophobic or hydrophobic coating is configured to reduce eddy currents in the cavity.

In one or more embodiments, the inner surface may have an outer bend portion and an inner bend portion, and the oleophobic or hydrophobic coating may only be on the outer bend portion. Alternatively, the oleophobic or hydrophobic coating may only be on the inner bend portion. Further, the inner surface may have an outer bend portion and an inner bend portion, and the oleophobic or hydrophobic coating may be on both the outer bend portion and the inner bend portion. The oleophobic or hydrophobic coating may be a super oleophobic or hydrophobic coating having a contact angle with an oil-based or water-based coolant of at least 130 degrees, respectively. The inner surface may be in a slip condition with reduced friction loss. The automatic transmission fluid cooling conduit may further include a hydrophilic or oleophilic coating, on at least a portion of the inner surface, configured to further alter a flow profile of fluid in the elbow portion.

According to an embodiment, an automatic transmission fluid cooling conduit is disclosed. The automatic transmission fluid cooling conduit includes an inlet, an outlet, and an elbow portion connecting the inlet and outlet. The elbow portion has an inner surface defining a cavity in fluid communication with the inlet and outlet. The inner surface includes an outer bend portion. The automatic transmission fluid cooling conduit also includes an oleophobic or hydrophobic coating, only on the outer bend portion, configured to alter a flow profile of fluid in the elbow portion.

In one or more embodiments, the oleophobic or hydrophobic coating may be configured to reduce eddy currents in the elbow portion. The automatic transmission fluid cooling conduit may further include a hydrophilic or oleophilic coating, on at least a portion of the inner surface, configured to further alter the flow profile of fluid in the elbow portion. The oleophobic or hydrophobic coating may be a super oleophobic or hydrophobic coating having a contact angle with an oil-based or water-based coolant of at least 130 degrees, respectively.

According to an embodiment, a vehicle transmission system is disclosed. The vehicle transmission system includes an automatic transmission fluid cooler having a plurality of elbow portions and an inner surface defining a cavity for transmission fluid, a pump fluidly connected to the cooler for propelling the transmission fluid, and an oleophobic or hydrophobic coating. The oleophobic or hydrophobic coating is on portions of the inner surfaces and configured to reduce eddy currents in the elbow portions.

In one or more embodiments, the elbow portions may each include an outer bend portion and an inner bend portion, and the oleophobic or hydrophobic coating may only be on the outer bend portion. Alternatively, the oleophobic or hydrophobic coating may only be on the inner bend portion. Further, the elbow portions may each include an outer bend portion and an inner bend portion, and the oleophobic or hydrophobic coating may be on both the outer bend and inner bend portions. The oleophobic or hydrophobic coating may be a super oleophobic or hydrophobic coating having a contact angle with an oil-based or water-based coolant of at least 130 degrees, respectively. The portion of the inner surface with the oleophobic or hydrophobic coating may be in a slip condition with the transmission fluid to reduce friction loss.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure relates to improving coolant flow in a vehicle system, such as a vehicle transmission system. The vehicle transmission system includes a cooling system, or an automatic transmission fluid (ATF) flow system, for circulating coolant (e.g., water/glycol, oil, or ATF) within components of the ATF flow system before entering a transmission housing. The components of the ATF flow system may include ATF flow lines, an ATF cooler, and a coolant pump. Pressure drops may occur in the flow lines and the ATF cooler before the coolant enters the transmission case. ATF typically has a high viscosity and a low surface tension, therefore inducing low contact angles on the inner surface of the conduits forming the flow lines and ATF cooler. These properties may cause large friction losses along the flow lines and cooler with high flow rates as shown in equation (1) below.

$$\Delta P = f \cdot \frac{L}{D} \cdot \frac{\rho V^2}{2}, \text{ where } f \text{ is a friction factor.} \quad (1)$$

Pressure drops may be accelerated when ATF flow lines have sharp turns (e.g., elbows or bends), or long flow path lines at high flow rates. Parasitic pressure drops in the ATF flow system may cause power losses and require a large coolant pump capacity. Also, since the ATF pump in hybrid vehicles runs intermittently depending on electric machine temperatures and lubrication requirements, the time delay to deliver ATF to the transmission housing due to the pressure drops can be reduced such that coolant control response is faster. As such, reduction of coolant pump size and power losses are important aspects to increase the performance and fuel economy of the ATF flow system, as well as the capability of the electric machine.

According to one or more embodiments of the present disclosure, resistance and friction is reduced by applying advanced coating materials, including a "repellant" coating and a "wetting" coating. For example, repellant coatings include oleophobic, super-oleophobic, hydrophobic, and super-hydrophobic coatings. Wetting coatings include oleophilic, super-oleophilic, hydrophilic, and super-hydrophilic coatings. Both repellant and wetting coatings may be applied to the ATF flow system to improve efficiency. Advanced coating components will increase or decrease the contact angle of the ATF (or other liquid) on the coated surface.

Figure 1:
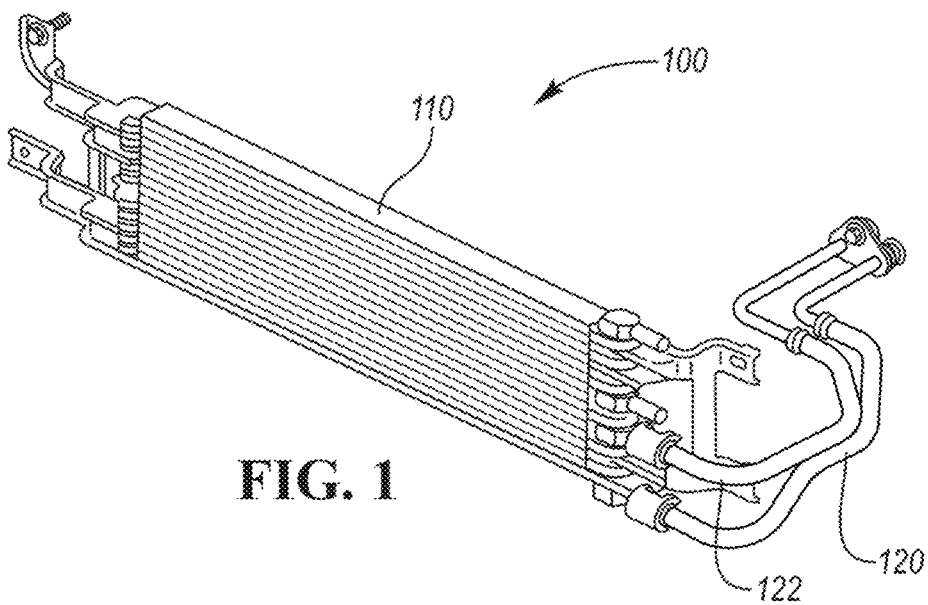
FIG. 1 is a perspective view of an exemplary automatic transmission fluid (ATF) flow system.

FIG. 1 shows an ATF flow system 100 of a vehicle transmission. ATF flow system 100 includes a heat exchanger, or ATF cooler 110, and flow lines 120, 122 in fluid communication with one another. The flow lines 120, 122 and ATF cooler 110 include automatic transmission fluid cooling conduits defining cavities for flowing coolant through the flow system 100. The ATF flow system 100 also includes a pump (not shown) for propelling coolant through the conduits of the flow lines and ATF cooler. The ATF cooler 110 conduit includes straight portions and a plurality of large turn, or elbow, portions. The straight conduit portions leading into and out of the elbow portions are hereinafter referred to as inlet portions and outlet portions (or inlets and outlets), and define inlet and outlet cavities for coolant flow with respect to the elbow portion. Although large turns are only shown for the conduit of ATF cooler 110, large turns may also be in the conduit flow lines of the ATF flow system 100. In the elbow portions of ATF cooler 110 (and in large turns in conduit flow lines), the coolant may stagnate and/or recirculate (e.g., forms eddies or eddy currents) in certain regions or zones. These zones, referred to herein as recirculation zones, may result due to low or no-slip conditions at the inner surface of the conduit. These conditions may be caused by the relatively high angle turns in the elbows of the flow lines 120, 122 and ATF cooler 110. The recirculation zones may occur in the corner(s) of a high angle turn. Accordingly, a portion of the coolant may become stuck in the recirculation zones during operation of the ATF flow system 100 and may reduce the effectiveness and/or efficiency of the pump and system.

In at least one embodiment, the present disclosure includes the application of a coating or coatings to the inner surface of a coolant conduit to affect, alter, and/or control coolant flow within the flow lines 120, 122 and ATF cooler 110, such as by altering the low or no-slip condition at the inner surface of the conduit to a slip condition, or changing a flow profile of fluid (ATF) in the conduit. The coating(s) may be a (super) hydrophobic and/or (super) oleophobic coating or a (super) hydrophilic and/or (super) oleophilic coating. Hydrophobic and oleophobic coatings are those that repel or have a very high contact angle with water and oil, respectively, therefore may form a surface with minimal or zero wetting and can expel coolant droplets with small force or gravity (i.e., form a slip condition at the surface). Hydrophilic and oleophilic coatings are those that attract or have a very low contact angle with water and oil, respectively.

Figure 2:
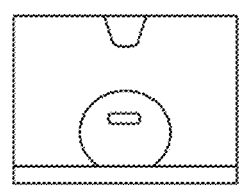
FIG. 2 is a schematic of a droplet of water (or oil) on a super hydrophobic (or super oleophobic) coating surface having a contact angle of at least 130 degrees.

With reference to FIG. 2, a schematic of a droplet of water-based or oil-based fluid, or coolant (e.g., automatic transmission fluid, ATF), is shown on a super hydrophobic/oleophobic coating. As shown, the droplet forms almost a perfect sphere on the coating due to its repellence, which reduces friction loss. Super hydrophobic/oleophobic coatings may cause droplets of water/oil to form contact angles of 130 degrees or higher with the coating. In contrast, on super hydrophilic and oleophilic coatings, droplets spread out and form an almost even layer on top of the coating. Super hydrophilic/oleophilic coatings may cause droplets of water/oil to form contact angles of 25 degrees or lower with the coating.

Any suitable hydrophobic, oleophobic, super hydrophobic, or super oleophobic coatings may be used in accordance with the present disclosure. In general, such coatings may have a high contact angle with the water or oils. Hydrophobic/oleophobic materials may generally be those forming a contact angle of at least 90 degrees, such as at least 100, 110, 120, 130, or 140 degrees, while super hydrophobic/oleophobic materials may generally be those forming a contact angle of at least 130 degrees with water/oil. The coatings may form such high contact angles as a result of a nano-scale surface structure. For example, the surface of the coating may be covered in very small projections, making the coating rough on a nano-scale. The gaps between the projections may trap air and make it energetically unfavorable for liquids to wet the surface. Similarly, any suitable hydrophilic, oleophilic, super hydrophilic, or super oleophilic coatings may be used in accordance with the present disclosure. In general, such coatings may have a low contact angle with the water or oils. Hydrophilic/oleophilic materials may generally be those forming a contact angle of at most 50 degrees, such as at most 40 or 30 degrees, while super hydrophilic/oleophilic materials may generally be those forming a contact angle of 25 degrees or less with water/oil.

Examples of various (super) hydrophobic/oleophobic and (super) hydrophilic/oleophilic compositions and treatment methodologies are provided in U.S. Patent Publication Nos. 2013/0109261, 2012/0009396, 2010/0314575, 2012/

0045954, and 2006/0029808, and also in U.S. Pat. Nos. 8,007,638, 6,103,379, 6,645,569, 6,743,467, 7,985,451, 8,187,707, 8,202,614, 7,998,554, 7,989,619, 5,042,991, 8,361,176, 8,258,206, 6,458,867, 6,503,958 and 6,723,378, and also in International Publication No. WO2013/058843, the disclosures of which are incorporated herein by reference.

The (super) hydrophobic/oleophobic coating may be applied to the ATF cooler or flow line conduit inner surface using any suitable method, which may depend on the composition of the coating itself. In one embodiment, the coating may be applied by spraying. In another embodiment, the coating may be applied using a form of deposition, such as physical vapor deposition (PVD) or chemical vapor deposition (CVD). In another embodiment, the coating may be physically transferred to the electronic device, such as by rolling or brushing. Regardless of the method of application, masks may be used to only coat certain desired areas or regions.

Figure 3:
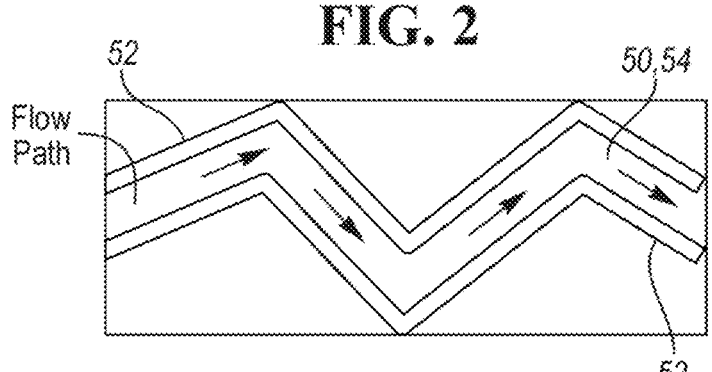
FIG. 3 is a top view of an exemplary coolant channel formed between two layers of hydrophobic or oleophobic coating.
Figure 4:
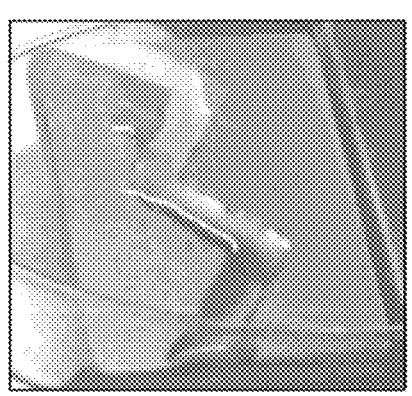
FIG. 4 is a photograph of a coolant channel formed by a (super) hydrophobic or oleophobic coating according to an embodiment.

With reference to FIGS. 3 and 4, a schematic example and photograph of an experimental sample are shown of a hydrophobic/oleophobic (hereinafter, "repellant") coating altering the flow profile of a fluid, such as a liquid coolant (e.g., water/glycol or ATF) by forming a flow path 50 for the liquid. The flow path 50 is shown for illustrative purposes of the flow control provided by the coating material on a surface. The flow path 50 may be formed by one or more lines, strips, layers, or areas of the repellant coating 52, forming boundaries. In other embodiments, the coating 52 alters the flow by reducing friction between the coolant and coated surface, therefore altering the flow profile within a conduit. In the example shown in FIG. 3, two spaced apart lines of coating 52 form the boundaries for the flow path 50. The lines may be evenly spaced to form the flow path 50 having a constant or substantially constant width. However, in other embodiments, the flow path 50 may have a non-constant width. The coating lines forming the boundaries may be configured to form a flow path 50 having any shape or pattern, or provide a change from a low or no-slip condition on the surface. In the embodiment shown in FIG. 3, the coating 52 forms a zig-zag flow path 50, which may also be referred to as a sinuous, serpentine, winding, or oscillating flow path 50. In at least one embodiment, the line(s) of the repellant coating 52 may form boundaries for the flow path 50 without any raised walls or sunken/carved channels. That is, the flow path 50 may be formed due solely to the repellence of the liquid (e.g., coolant) from the coating 52. The use of the boundary lines, strips, areas, etc. of the repellant coating may therefore allow for control or influence of the flow of coolant without the need for relatively large physical barriers, such as channels walls, trenches, or troughs. Instead, a coating may be used to control/influence the flow of coolant by altering the contact angle at the surface, thus reducing friction loss at the surface during coolant flow. As shown in FIG. 4, the coating may be very thin so as to be essentially even or flush with the surface applied thereto relative to the height of the coolant being controlled within the conduit channels. For example, the coating may have a thickness of less than 1 mm, such as less than 500 µm, 250 µm, 100 µm, 50 µm, 25 µm, or 15 µm.

In at least one embodiment, in addition to the boundary line(s) of the repellant coating 52, a hydrophilic or oleophilic coating 54 may also be applied to form the flow path 50. In one embodiment, at least a portion of the area of the flow path 50 may be coated with the hydrophilic or oleophilic coating (herein after "wetting coating"). For example, the entire area of the flow path 50 may be coated with the wetting coating. In another embodiment, lines of the wetting coating may be applied within the flow path 50. For example, lines may be applied that are parallel to the lines of the repellant coating 52. Accordingly, the wetting coating may help further control the flow of a coolant within the flow path. The lines of the repellant coating 52 may form an outer boundary of the flow path 50 while the wetting coating encourages the coolant to flow across it in the desired direction.

Figure 5A:
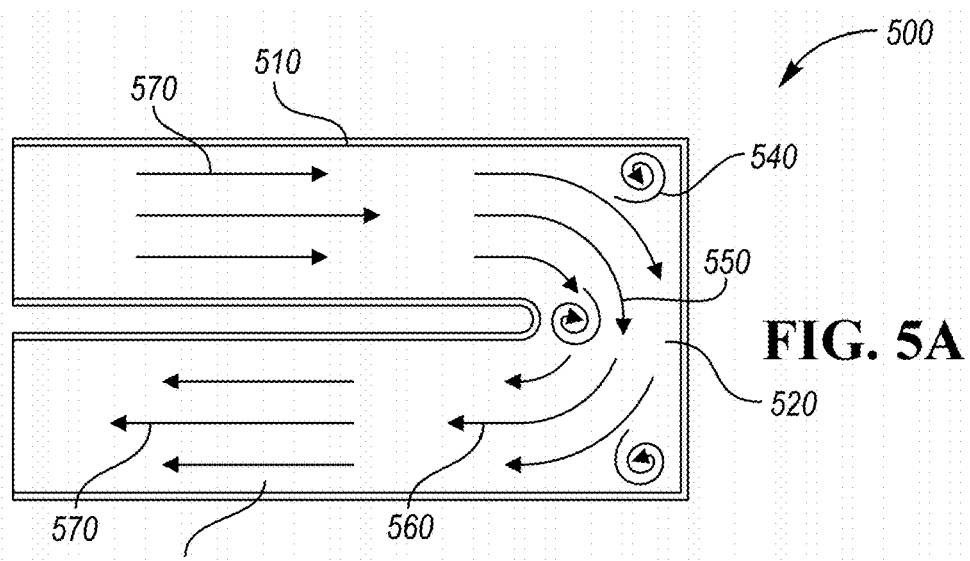
FIGS. 5A and 5B are schematic illustrations of a conduit elbow without and with a coating, respectively.
Figure 5B:
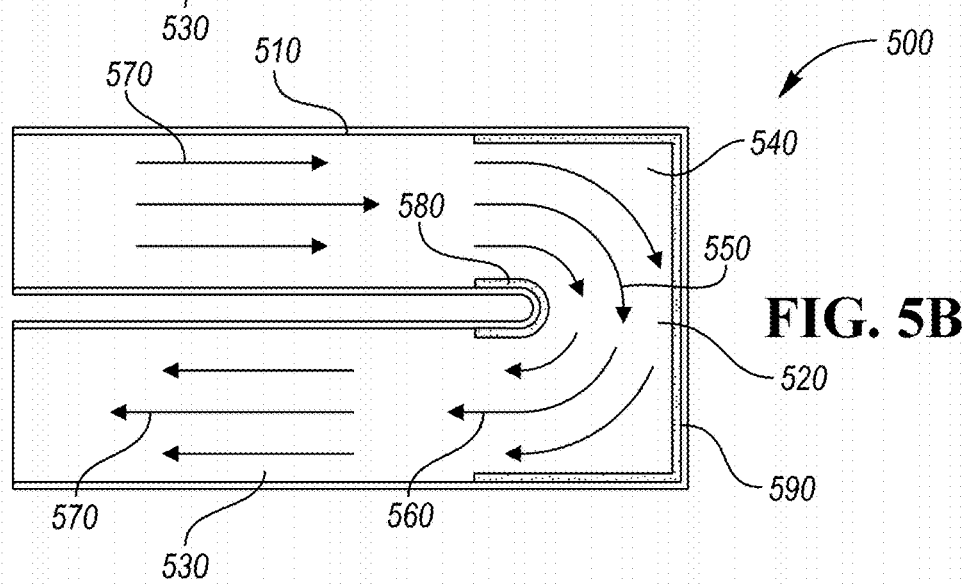

FIGS. 5A and 5B show a large turn, or elbow portion 500, of a conduit of an ATF cooler 110 or flow lines 120, 122 without and with a (super) hydrophobic or oleophobic coating, respectively. In FIG. 5A, elbow portion 500 has an inlet 510 and outlet 530, with turn area 520 therebetween. Coolant flow lines 570 are shown in the inlet 510 and outlet 530 regions. As coolant flow enters the turn area 520, coolant flow 550 in the turn area develops eddy currents 540 in recirculation zones, trapping some coolant, before at least a portion of the coolant flow 560 exits the turn area 520. These recirculation zones may be caused by friction loss at the inner surface of the conduit because of a low or no-slip condition at the surface.

According to an embodiment, as shown in FIG. 5B, an elbow portion 500 of a conduit of an ATF cooler 110 or flow lines 120, 122 includes a (super) hydrophobic or oleophobic coating. FIG. 5B shows inlet 510 and outlet 530 having flow 570. The turn area 520 has an outer bend portion and an inner bend portion which form the inner surface of the conduit in the elbow portion 500. Both the outer bend and inner bend portions may be coated with (super) hydrophobic or oleophobic coatings 580, 590, respectively. The coatings 580, 590 alter the low or no-slip condition at the inner surface of the conduit to a slip-condition, therefore reducing friction loss at the inner surface. Thus, flow 550 may not include recirculation zones with eddy current, and the coolant flow 560 exits the turn area 520. Although coatings 580, 590 are both included in the illustrated example, in other embodiments, only portions of the inner surface of the conduit may be coated. For example, only the portion relating to the outer bend area of the conduit inner surface may be coated. Alternatively, only the portion relating to the inner bend area of the conduit inner surface may be coated. The coating 580, 590 may be applied to areas corresponding with forming eddy current based on pump size and speed, to reduce power loss issues in those regions.

Figure 6A:
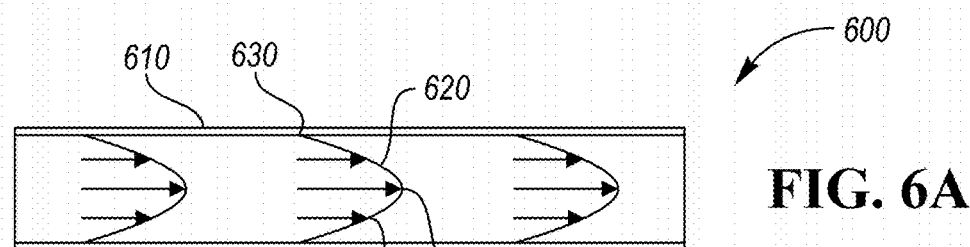
FIGS. 6A and 6B are schematic illustrations of a portion of a conduit without and with a coating, respectively.
Figure 6B:
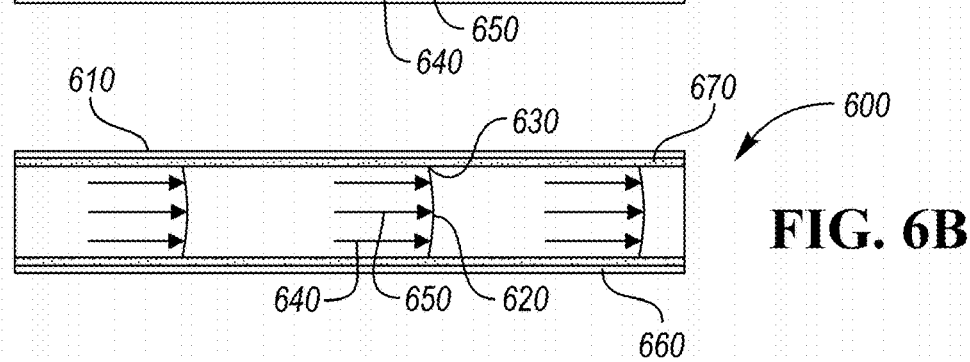

FIGS. 6A and 6B show a straight portion of a conduit 600 of an ATF cooler 110 or flow lines 120, 122 without and with a (super) hydrophobic or oleophobic coating, respectively. In FIG. 6A, conduit 600 includes a body 610 defining an inner surface 630 and a cavity. Coolant flow 650 forms a flow profile 620, due to friction losses at the inner surface 630 as shown by flow arrow 640. The inner surface 630 of the body 610 of the conduit 600 results in friction loss due to a low or no-slip condition of coolant flow 650 at the inner surface 630.

According to an embodiment, as shown in FIG. 6B, a straight portion of a conduit 600 of an ATF cooler 110 or flow lines 120, 122 includes coated areas 660, 670 on the inner surface 630 of the conduit body 610. As such, coolant flow 640, 650 is more uniform, as shown by flow profile 620, due to less friction loss at the inner surface 630 because the coated areas 660, 670 alter the low or no-slip condition to a slip condition. Although coated areas 660, 670 are both included in the illustrated example, in other embodiments, only portions of the inner surface of the conduit may be coated. For example, only a portion on a top region of the inner surface may be coated, and alternatively, only a bottom region of the inner surface may be coated.

Similar to the above embodiments with respect to FIGS. 3-4, a wetting coating may also be applied within the conduit and conduit elbows to further encourage coolant to flow therethrough. For example, the wetting coating may be applied to portions or all of the inner surface of the conduit, such as in the form of lines or as a continuous layer. In one embodiment, the wetting coating may be applied in an arcuate direction in the area indicated by the flow arrows. The wetting coating(s) may therefore further facilitate the flow of coolant through the conduits and reduce eddy current in the conduits.

Accordingly, (super) hydrophobic and/or oleophobic coating materials and/or (super) hydrophilic or oleophilic coating materials may be utilized in ATF flow systems to improve pump efficiency and reduce pump size/capacity by reducing pressure drop in the ATF cooling conduits. The use of these coating materials on the inner surface of conduits and conduit elbow portions may allow for reduced friction loss and eddy current in recirculation zones without needing added fixtures on the surface, which may require additional costs and may result in efficiency losses. In addition, the coating materials may improve the fuel economy of a vehicle by reducing power loss. Moreover, a reduction in ATF pump size may be realized due to the super hydrophobic/oleophobic coated surfaces in the ATF flow system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
an automatic transmission fluid cooling conduit including an inlet portion, an outlet portion, an elbow portion connecting the inlet and outlet portions and having an inner surface with an outer bend portion and inner bend portion defining a cavity in fluid communication with the inlet and outlet portions, and an oleophobic or hydrophobic coating only on a first portion of the inner bend portion and a hydrophilic or oleophilic coating on a second portion of the inner bend portion, the oleophobic or hydrophobic and oleophilic or hydrophilic coatings cooperating to alter a flow profile of fluid through the elbow portion and reduce eddy currents in the cavity.

2. The system of claim 1, wherein the oleophobic or hydrophobic coating is a super oleophobic or super hydrophobic coating having a contact angle with an oil-based or water-based coolant, respectively, of at least 130 degrees.

3. The system of claim 1, wherein the inner surface is in a slip condition with reduced friction loss.

4. An automatic transmission fluid cooling conduit comprising:
an inlet;
an outlet;
an elbow portion connecting the inlet and outlet and having an inner surface defining a cavity in fluid communication with the inlet and outlet, wherein the inner surface includes an outer bend portion and an inner bend portion;
an oleophobic or hydrophobic coating, only on the outer bend portion; and
a hydrophilic or oleophilic coating, on at least a portion of the outer bend portion, configured to further alter a how profile of fluid in the elbow portion.

5. The conduit of claim 4, wherein the oleophobic or hydrophobic coating is configured to reduce eddy currents in the elbow portion.

6. The conduit of claim 4, wherein the oleophobic or hydrophobic coating is a super oleophobic or super hydrophobic coating having a contact angle with an oil-based or water-based coolant, respectively, of at least 130 degrees.

7. A vehicle transmission system comprising:
an automatic transmission fluid cooler having a plurality of elbow portions and an inner surface defining a cavity for transmission fluid, the inner surface including an outer bend portion and an inner bend portion;
a pump fluidly connected to the cooler for propelling the transmission fluid; and
an oleophobic or hydrophobic coating only on a first portion of the outer bend portion and a hydrophilic or oleophilic coating on a second portion of the outer bend portion, the oleophobic or hydrophobic and oleophilic or hydrophilic coatings cooperating to alter a flow profile of fluid through the elbow portion and reduce eddy currents in the cavity.

8. The system of claim 7, wherein the oleophobic or hydrophobic coating is a super oleophobic or super hydrophobic coating having a contact angle with an oil-based or water-based coolant, respectively, of at least 130 degrees.

9. The system of claim 7, wherein the first portion of the outer bend portion of the inner surface with the oleophobic or hydrophobic coating is in a slip condition with the transmission fluid to reduce friction loss.

* * * * *